United States Patent [19]

Maclaren, deceased et al.

[11] 4,232,897
[45] Nov. 11, 1980

[54] LIE BACK BUGGY

[75] Inventors: Owen F. Maclaren, deceased, late of Barby, England; by William L. Barber, executor, Rugby; by Marie I. Maclaren, executor, Barby, both of England

[73] Assignee: Andrews Maclaren Ltd., England

[21] Appl. No.: 922,439

[22] Filed: Jul. 6, 1978

[30] Foreign Application Priority Data

Jul. 7, 1977 [GB] United Kingdom ............... 28599/77
Feb. 17, 1978 [GB] United Kingdom ................ 6424/78
Aug. 26, 1978 [GB] United Kingdom ............... 35902/78

[51] Int. Cl.³ ................................................ A47C 4/30
[52] U.S. Cl. ...................................... 297/45; 248/436; 280/647; 280/650; 280/657; 297/DIG. 4
[58] Field of Search .............................. 297/45, 42–44, 297/39, 54, DIG. 4; 248/172, 173, 155, 188.6, 436; 211/200, 195; 280/42, 642, 644, 647, 648, 650, 657, 658

[56] References Cited

U.S. PATENT DOCUMENTS

| 2,695,654 | 11/1954 | Boyd | 297/376 X |
| 2,713,893 | 7/1955 | Kuhl | 297/376 X |
| 3,390,893 | 7/1968 | MacLaren | 280/650 X |
| 3,968,991 | 7/1976 | MacLaren | 297/45 |
| 4,007,947 | 2/1977 | Perego | 280/642 |
| 4,111,454 | 9/1978 | Kassai | 280/650 X |
| 4,118,052 | 10/1978 | Cabasnero | 280/650 X |

FOREIGN PATENT DOCUMENTS

| 1154362 | 6/1969 | United Kingdom . |
| 1321085 | 6/1973 | United Kingdom . |
| 1508689 | 4/1978 | United Kingdom . |
| 1524349 | 9/1978 | United Kingdom . |

*Primary Examiner*—William E. Lyddane
*Attorney, Agent, or Firm*—Stevens, Davis, Miller & Mosher

[57] ABSTRACT

A foldable chair frame formed by elongate rigid members which are interpivotted and foldable into a compact bundle of elements. The rigid members include a base formed by a laterally collapsible X-frame, two back members, two lower brace members connected to two upper brace members by knuckle joints, two seat support members and two upwardly extending back rest members. The invention resides in the provision of a laterally collapsible bracing frame located at the lower end of the back members adjacent the X-frame and arranged to be locked to hold the chair in the unfoldable (usable) position while permitting the back rest members to be moved between a forward position, suitable for a person sitting in the chair, to a backward position, suitable for a person reclining in the chair.

7 Claims, 17 Drawing Figures

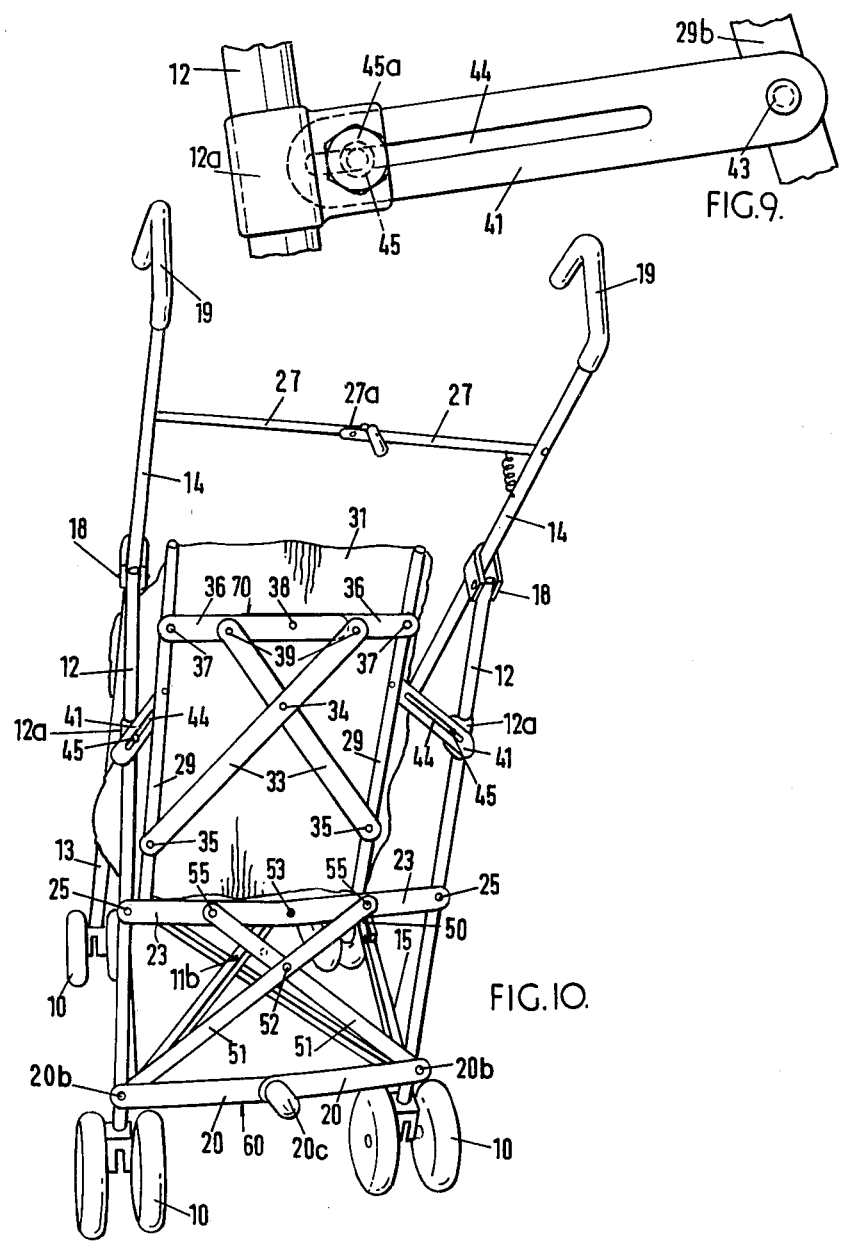

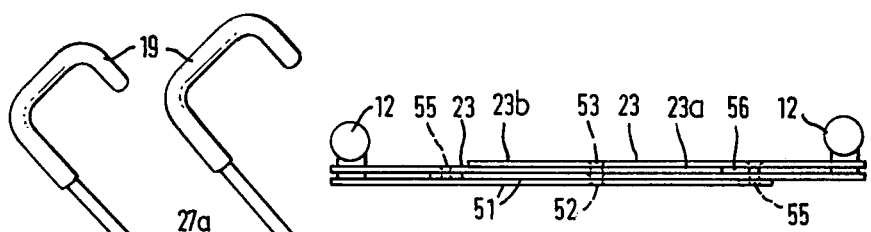
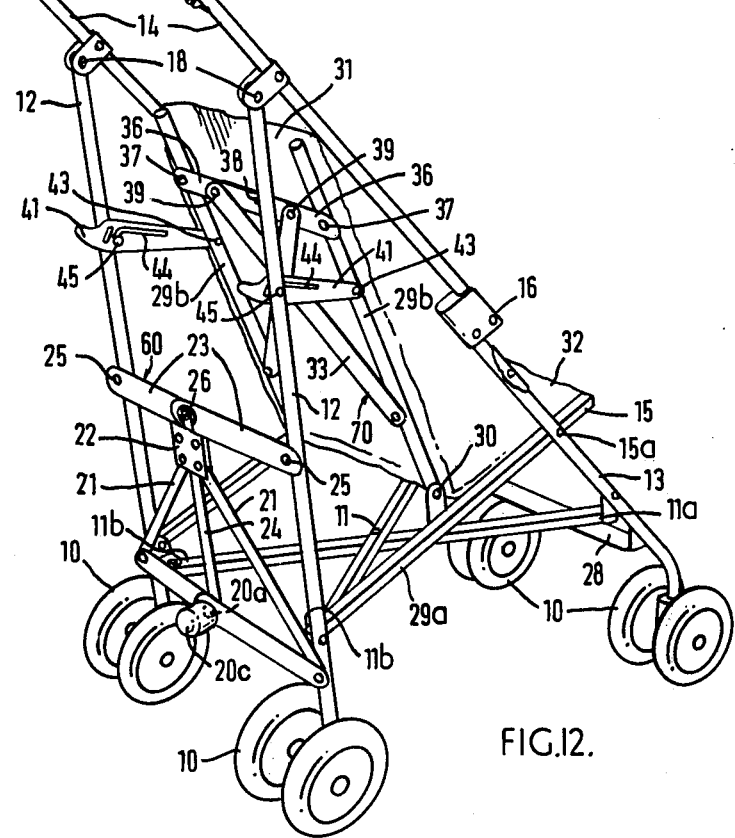
FIG.11.
FIG.12.

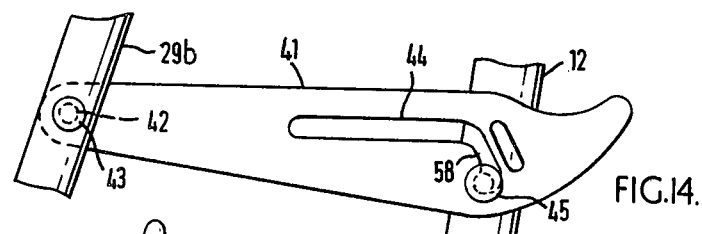
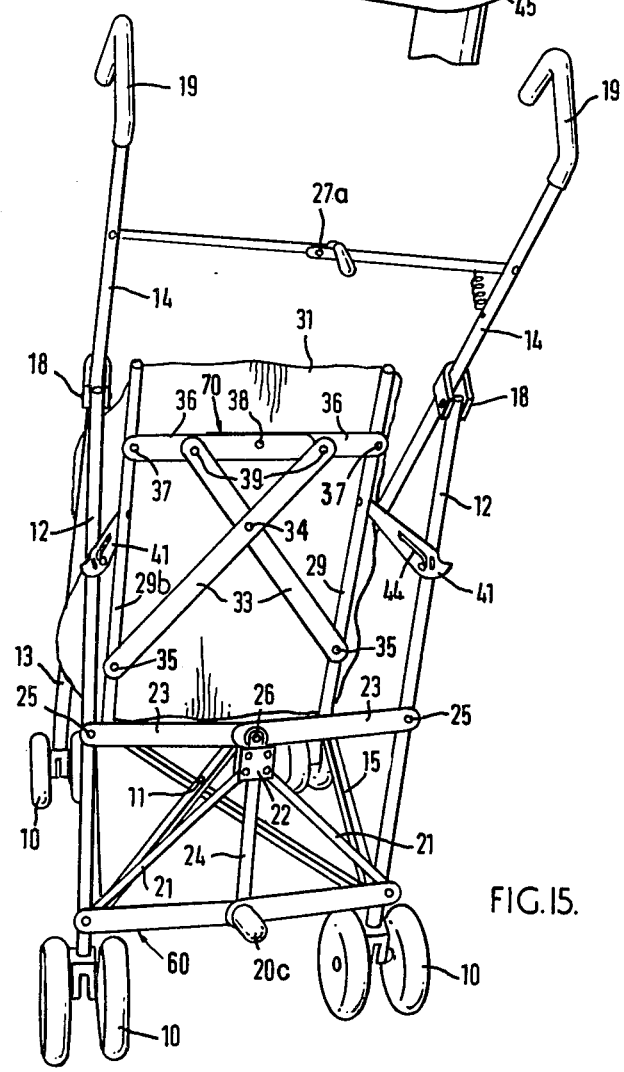
FIG.14.
FIG.15.

LIE BACK BUGGY

Owen Finlay Maclaren has developed highly successful chairs which fold compactly in the back to front sense and simultaneously in the side to side sense of the chairs, of which the push chairs described in U.K. Pat. No. 1,154,362 are examples. The chairs illustrated in that specification are each braced in the lateral, namely side to side, sense of the chair frame, partly by two foldable X-frames. One of these X-frames constitutes a bottom frame of the chair frame whereas the other X-frame constitutes the back frame of the chair. The two X-frames are pivotally interconnected by connections at their adjacent corners and by upright side frames which flank the X-frames. The X-frames, when being folded, elongate in a sense away from their adjacent corners, but can be held in a laterally extended condition by interpivotted struts which themselves can be locked in an extended condition. These struts also contribute to bracing of the chair frame in the side to side sense. This mode of bracing is very satisfactory.

A second known chair frame, which corresponds in essential particulars to the hereinbefore described chair frame with the notable exception of the X-frame which constitutes the back frame of the chair, comprises elongate rigid members which are interpivotted and foldable into a compact bundle of elements, the chair frame comprising a bottom X-frame which extends in a plane from back to front of the chair frame, in which plane the X-frame is foldable, an equal pair of side frames which extend in upright planes, each such side frame being pivotally interconnected with a respective front corner and a respective back corner of the bottom X-frame for pivoting and folding about the front and the back corners in a back to front sense, each such side frame comprising a chair back element which extends upwardly away from a respective back corner of the bottom X-frame, the chair back element of one such side frame being coplanar with the chair back element of the other such side frame, a pair of interpivotted bracing elements which slope upwardly and back between the respective front corner of the bottom X-frame and the upper end of the respective chair back element, the pair of bracing elements comprising a lower element and an upper element which are interconnected by a first pivot connection, there being a second pivot connection between the lower element and the respective front corner of the bottom X-frame, and a third pivot connection between the element and the upper end of the respective chair back element, the side frame further comprising a seat supporting element which extends between the respective back corner of the bottom X-frame to which back corner the seat supporting element is pivotally connected, and the lower bracing element to which the seat supporting element is connected by a pivot connection located between the first and the second pivot connections, the seat supporting element in each side frame thereby ensuring that folding of each side frame and of the bottom X-frame take place simultaneously, the chair frame further comprising at the back thereof a pair of locking struts interconnected by a pivot and pivotally connected at opposite ends to the back corners or the bottom X-frame, the pair of struts when locked in an extended condition sustaining the chair frame in an extended condition, and an equal pair of oblique struts for bracing the chair frame in the side to side sense, the oblique struts having an interconnection about which to pivot relatively to each other and being arranged to unfold to supply a bracing frame of X-form which extends between the chair back element in each side frame, the oblique struts having lower ends pivotally connected to the back of the chair frame at the back corners of the bottom X-frame, and having upper ends pivotally connected indirectly to the chair back elements, the interconnection between the oblique struts being located in a fixed position in relation to the back corners of the bottom X-frame when the locking pair of struts is locked in an extended condition, the oblique struts thereby being inclined in opposite senses to each other and oblique to each chair back element.

The upper ends of the bracing X-frame cannot themselves be connected to pivot at fixed locations on the parallel chair back elements because the bracing X-frame, when being folded, must be allowed to elongate away from its lower ends at the back corners of the bottom X-frame, and this gives rise to the problem of reconciling the need to connect the upper ends of the bracing X-frame to the chair back elements and to permit elongation of the bracing frame during folding, with the desirability of optimum stiffening of the chair frame, in particular the chair back, in the side to side sense.

In order to deal with this problem, it has been proposed that the bracing frame formed by unfolding the oblique struts should be of X-form, known per se, or of an X truncated to an inverted V-form, and the interconnection between the oblique struts locates a connection which comprises a pair of links, each such link being supported on a respective first pivot at one end of the link at a fixed location on a respective chair back element, the fixed location being remote from the first pivot of the link, indirectly to the interconnection between the oblique struts.

Furthermore the hereinbefore described second known chair frame also has a pair of equal seat back elements of rigid elongate form arranged between the side frames, each such seat back element having an upper end and a lower end, one such seat back element being pivoted by its lower end on one of the seat support elements, and the other such seat back element being pivoted by its lower end on the other seat support element, there being a second pair of oblique struts provided for bracing the seat back elements in the side to side sense when in an extended condition, the second pair of oblique struts having an interconnection about which to pivot relatively to each other and being arranged to unfold to supply a second bracing frame of X-form which extends between the side frames, the interconnection between the second pair of oblique struts being located in a fixed position in relation to the seat back elements when the chair frame is in an extended condition, the second pair of oblique struts thereby being located so that the struts thereof are inclined in opposite senses to each other and oblique to the seat back elements, the second bracing frame having upper ends with connections which allow pivoting of the upper ends of the second bracing frame in relation to the seat back elements, and having lower ends with fixed locations in which to pivot in relation to the side frames and to the seat back elements.

A problem, similar to that described hereinbefore, exists, in stiffening the seat back elements of the chair frame in the side to side sense.

However, in both the chair frames described above, the difficulty arises that the presence of the X-frame or other bracing frame prevents or seriously restricts the movement of the seat back rest from a forward position, suitable for a person sitting in the chair, towards a backward position, suitable for a person reclining in the chair.

An object of this invention is to provide a foldable chair frame which alleviates the above-mentioned difficulty.

According to the invention, there is provided a chair frame of elongate rigid members which are interpivoted and foldable into a compact bundle in which the rigid members extend substantially parallel to each other, the chair frame comprising two base members which are pivotally interconnected to form a laterally collapsible X-frame in which the opposite ends of the two base members provide front and back corners of the X-frame; two back members which are disposed on coplanar axes and respectively extend upwardly from pivotal connections at the back corners of the X-frame; two lower brace members respectively pivoted, at their lower ends, to the front corners of the X-frame; two upper brace members respectively pivoted, at their upper ends, to the upper ends of the back members; two knuckle joints respectively connecting the two lower brace members to the two upper brace members so as to prevent folding of the back members towards the X-frame when the chair frame is extended with the lower brace members respectively extending substantially colinearly with the upper brace members and the front or rear corners of the X-frame are held apart, but to allow the knuckle joints to move towards the back corners of the X-frame, thus permitting folding of the back members towards the X-frame, when the back corners of the X-frame are allowed to move towards each other; two seat support members respectively pivoted to the chair frame at or adjacent the back corners of the X-frame and respectively pivoted to the lower brace members between the knuckle joints and the front corners of the X-frame; two upwardly extending back rest members, which are disposed on coplanar axes and form part of a laterally collapsible back rest, respectively supported on the two seat support members for pivotal movement so that the upper ends of the back rest members are movable between upper and lower positions; and link means extending between the back members and forming therewith a laterally collapsible bracing frame which can be locked to hold the back corners of the X-frame apart, the bracing frame being located adjacent the X-frame so that the back rest members can be moved between their upper and lower positions without being obstructed by the collapsible bracing frame.

Thus a chair frame constructed in accordance with the invention has the advantage that it can be designed to permit a considerable degree of movement of the back rest members from a forward position suitable for a person in a sitting position in the chair, to a backward position, suitable for a person reclining in the chair.

The laterally collapsible bracing frame may comprise two substantially identical parallelogram linkages each formed by respective links pivotally connected to respective back members and to a common member disposed parallel to the back members.

The laterally collapsible bracing frame may also comprise two locking struts interconnected by a pivot and respectively pivotally connected at opposite ends to the back corners of the X-frame, two link members each such link member being supported on a respective first pivot at one end of the link at a fixed location on a respective back member, the fixed location being remote from the respective back corner from the X-frame and each such link member being pivotally connected, remote from the first pivot of the link member, to the pivotal connection of the two locking struts by a common member which forms with a locking strut, a link member and a back member, a parallelogram linkage.

The common member may form a guide for a slide arranged to limit movement of the parallelogram linkages. The slide may be pivotally connected to one of two obliquely disposed supporting members having their other ends connected to respective back corners of the X-frame.

The laterally collapsible frame may comprise a frame of X-form having two upper ends pivotally connected to respective upper link means pivotally connected to respective back members and two lower ends pivotally connected to respective lower link means pivotally connected to the back corners of the X-frame.

The upper link means may be interconnected by a second pivot, and each of the upper ends of the frame of X-form connected to a respective upper link means by a respective third pivot between the first pivot which supports the outer end of each upper link means on the respective link member 12, and the second pivot which interconnects the upper link means.

Each of the upper link means may have at an inner end thereof an extension beyond the second pivot, the extension of one such upper link means overlapping the other link means when the upper link means are in an extended condition, the extension of one such upper link means lying within a gap formed between the other such link means and the upper end of the frame of X-form connected to said other upper link means. The second pivot which interconnects the upper link means may be disposed above a horizontal line between each of the third pivots which interconnects the upper end of the frame of X-form and the inner ends of the upper link means.

The chair frame may be provided with two seat back links extending between the back rest members and forming therewith a second laterally collapsible bracing frame. The second laterally collapsible bracing frame may comprise a frame of X-form, having two upper ends connected to respective seat back links pivotally connected to respective back rest members and the two lower ends pivotally connected to respective back rest members.

The two seat back links may be interconnected by a second pivot, and each of the upper ends of the frame of X-form may be connected to a respective seat back link by a respective third pivot between a first pivot which supports the outer end of each seat back link on the respective back rest member and the second pivot which interconnects the seat back links.

Each of the seat back links may have at an inner end thereof an extension beyond the second pivot, the extension of one such seat back link overlapping the other seat back link when the seat back links are in the extended condition, the extension of one such seat back link lying within a gap formed between the other such seat back link and the upper end of the frame of the X-form connected to said other seat back link.

The second pivot which interconnects the seat back links may be disposed above a horizontal line between each of the third pivots which interconnect the upper end of the frame of X-form and the inner ends of the seat back links.

The chair frame may be provided with two adjustable securing devices respectively connecting the two back rest members respectively to the two back members so as to support the upper ends of the back rest members, at least when in their upper and lower positions.

Each adjustable securing device may comprise a link pivotally connected at one end to a back rest member and formed with an elongate slot which extends along the link from the other end thereof and receives a pivot pin on the back member.

The slot may be substantially L-shaped, with the foot of the L-slot located adjacent to said other end of the link and directed upwardly so that the link can pivot under gravity about the first pivot pin and engage the second pivot pin by the foot of the L-slot and thereby sustain the back rest member in the upper position.

In one embodiment of the invention the back rest members have lower ends which are respectively pivoted to two seat side members which respectively overlie the two seat support members, and each seat side member is connected to the seat support member which it overlies by at least two equal length parallel links which, together with the seat side member and said support member, form a parallelogram linkage so that when the upper ends of the back rest members are in their lower position, the seat side members may be moved from a rearward position into a forward position.

This embodiment of the invention has the advantage that it provides a foldable chair in which there are means for supporting a person in either the sitting or reclining position without substantially moving the position of the centre of gravity of the person relative to the base of the chair frame.

In a preferred embodiment of the invention the upper ends of the back rest members extend through the space between the two back members when supported by the adjustable securing devices in their lower positions, but are disposed in front of two back members when in their upper positions.

In one convenient form of construction, each adjustable securing device consists of a link which, at one end, is pivotally connected to the upper end of one of the back rest members and formed with an elongate slot, extending from the other end, for receiving a screw threaded pin which is carried by a bracket mounted on the back member adjacent the back rest member and provided with an internally screw threaded knob for tightening and loosening on adjustment of the arrangement of the back rest.

Examples of folding push-chair constructions embodying a frame according to the present invention will now be described with reference to the accompanying drawings.

FIG. 9 is a side elevation of part of the push-chair;

FIG. 10 is a rear view similar to FIG. 4, but showing a modified form of push-chair construction embodying the invention;

FIG. 11 is an end view of a part of the push-chair shown in FIG. 10;

FIGS. 12 and 13 are perspective views, partly from the side, of another push-chair construction embodying the invention, showing a seat back in forward and rearward reclined positions, respectively;

FIG. 14 is a side elevation of a part of the push-chair shown in FIGS. 12 and 13;

FIG. 15 is a rear view corresponding to FIG. 13; and

BEST MODES FOR CARRYING OUT THE INVENTION

Figure 1:
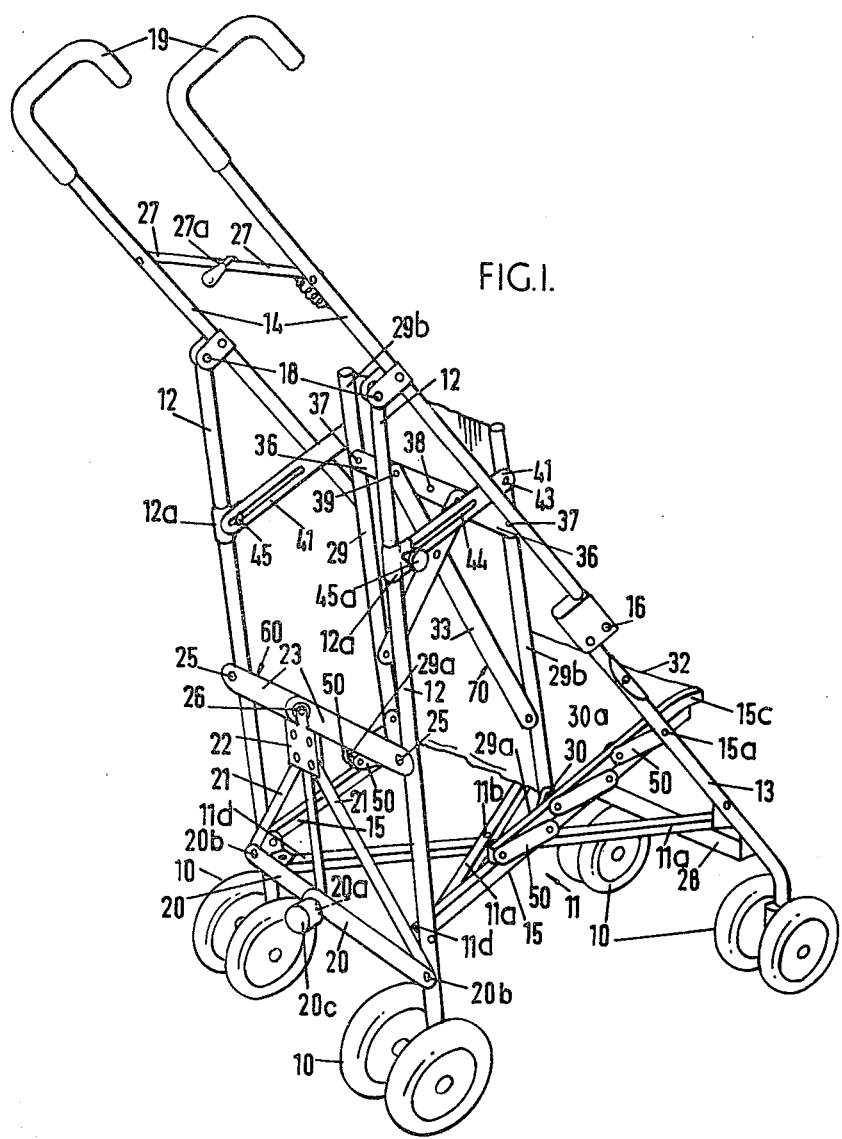
FIGS. 1 and 2 are perspective views, partly from the side, of one push-chair construction embodying the invention, showing a seat back in forward and rearward reclined positions, respectively.

Referring in the first instance to FIGS. 1 to 9 of the drawings, the folding push-chair is supported on wheels 10 and is constructed of elongate rigid members which are interpivotted and foldable into a compact bundle.

The push-chair frame comprises a bottom X-frame 11 which extends in a plane from back to front of the chair. The members 11a of the X-frame 11 are interconnected by a central pivot pin 11b and the frame 11 is foldable in the plane mentioned.

The chair further comprises a pair of identical side frames whose planes extend upwardly. The side frames are pivotally interconnected with respective front corners 11c and respective back corners 11d of the bottom X-frame 11, for pivoting and folding about the front and back corners 11c and 11d, respectively, in the back to front sense.

Each of the side frames comprises a chair back member 12 which extends upwardly away from a back corner 11d, member 12 of one side frame being coplanar with the member 12 of the other side frame. Each side frame further comprises a pair of interpivotted bracing members, namely a lower brace member 13 and an upper brace member 14, and a seat supporting member 15.

The brace members 13 and 14 of each side frame slope upwardly and back between the respective front corner 11c of the bottom X-frame 11 and the upper end of the respective chair back member 12. The members 13 and 14 are interconnected by a knuckle joint 16. There is a pivot connection 17 between the lower brace member 13 and the respective front corner 11c of the X-frame 11 and a pivot connection 18 between the upper brace member 14 and the upper end of the respective chair back member 12. Each upper brace member 14 has an extension to provide a pair of handles 19 for pushing the chair, or for carrying it folded.

Each seat support member 15 extends between the respective back corner 11d of the X-frame 11, and the respective lower brace member 13, the member 15 being pivotally connected to the back corner 11d. The member 15 is also connected to the member 13 by a pivot connection 15a located between the knuckle joint 16 and the pivot connections 17. The member 15 in each side frame thereby ensures that folding of each side frame and of the bottom X-frame 11 take place simultaneously.

Figure 2:
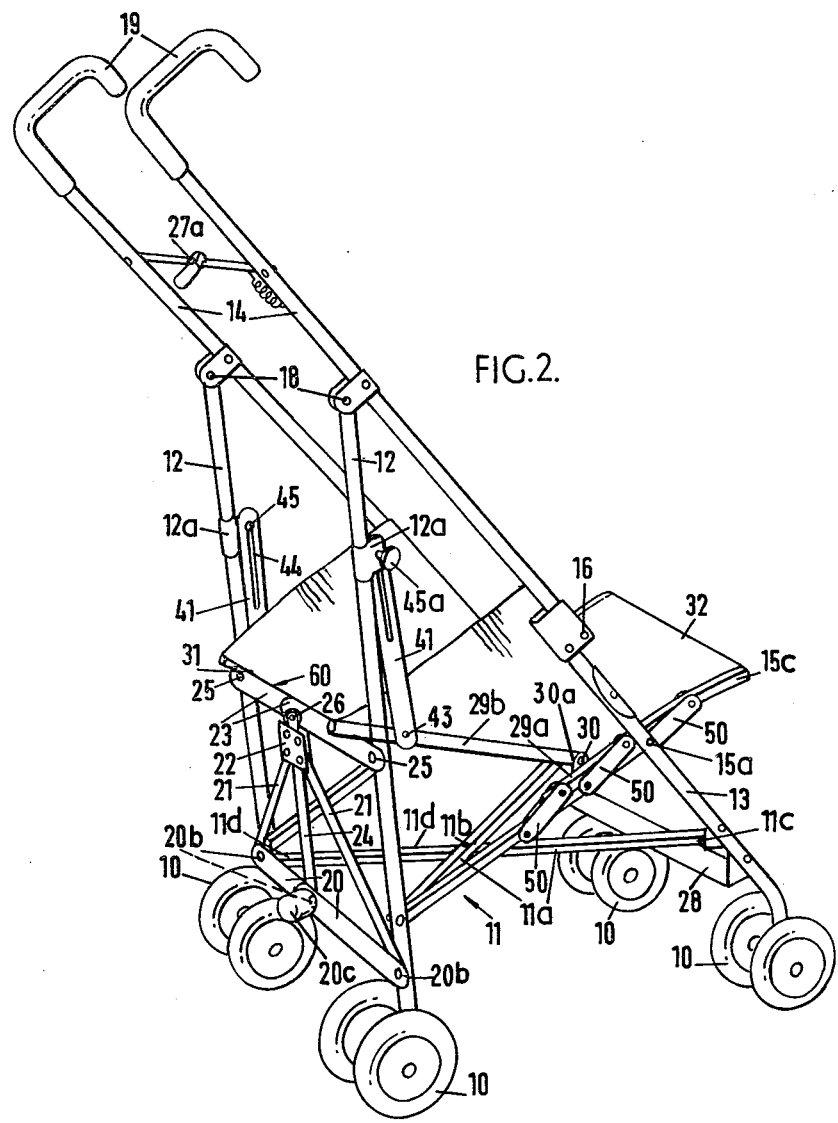
Figure 3:
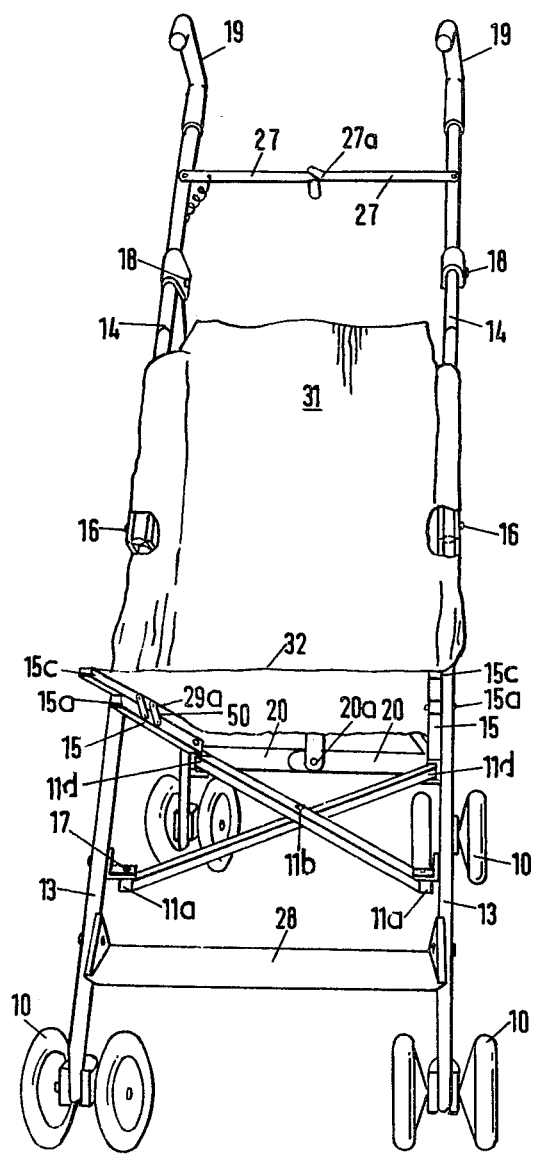
FIGS. 3 and 4 are front and rear views, respectively, of the push-chair in the condition shown in FIG. 2.

Two pairs of locking struts 20 and 23, respectively connected by pivot pins 20a and 26, have their opposite ends pivotally connected to spaced portions of the back members 12 by pivot pins 20b and 25 and are interconnected by means of a guide link 24 to form a laterally collapsible bracing frame 60 consisting of two identical parallelogram linkages. Stop means are provided in the form of a slider 22, which is able to slide up and down guide link 24, and two supporting struts 21 which are pivotally connected to the slider 22 and to the pivots 20b to support the slider 22 relative to the back members 12 so that the two pairs of struts 20 and 23 are simultaneously movable into and out of an overcentre locking condition in which the frame members are held apart with the push-chair in its extended condition, as shown in FIGS. 1 and 2. For convenience, a knob 20c can be provided on the pivot pin 20a for foot operation of the laterally collapsible bracing frame 60.

Figure 4:
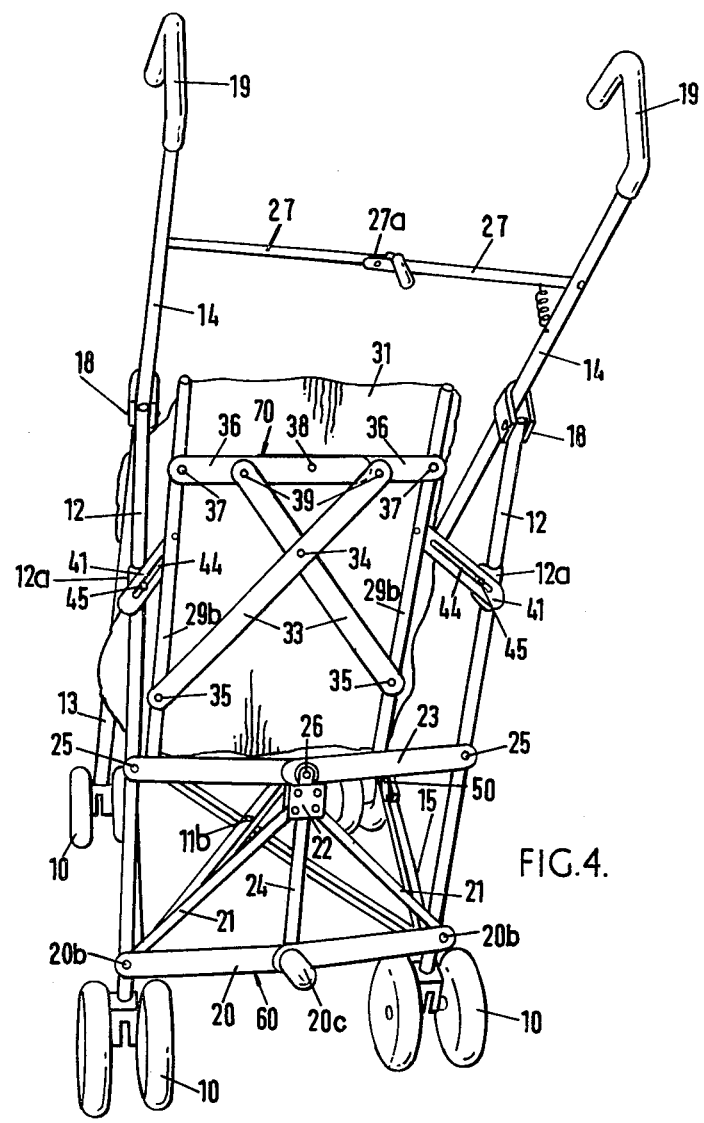
Figures 5, 6:
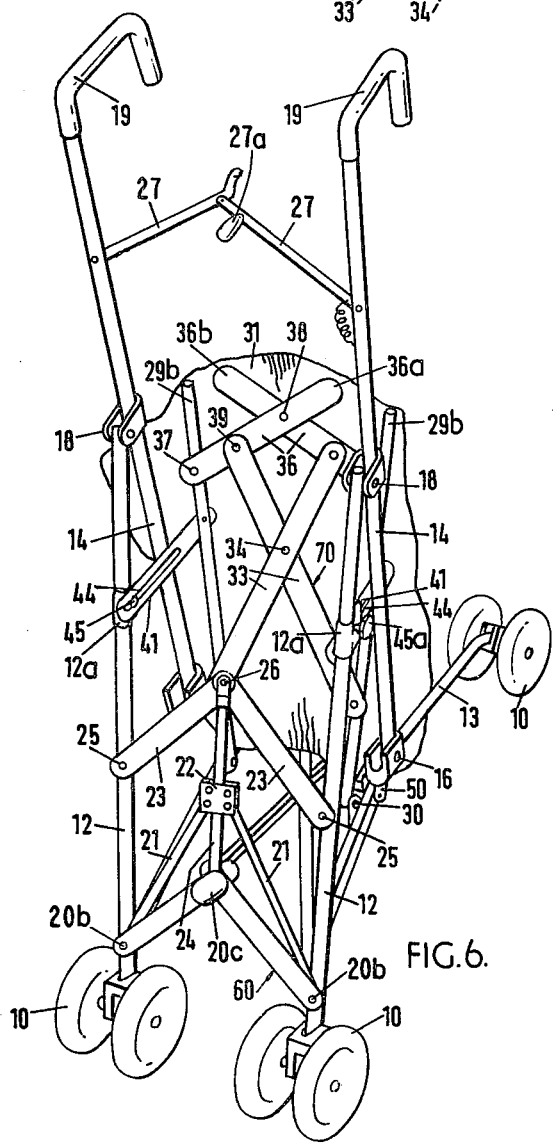
FIG. 5 is an end view of part of the push-chair shown in FIG. 1.
FIG. 6 is a perspective view of the push-chair, partly from the rear, showing the push-chair in a partly folded condition.

FIG. 4 shows the laterally collapsible bracing frame 60 in an extended condition, the slider 22 being adjacent to the locking struts 23. FIG. 6 shows the laterally collapsible bracing frame 60 partially collapsed and the slider 22 spaced from the locking struts 23.

An auxiliary pair of centre-locking or overcentre-locking struts 27 interpivotted at 27a is pivotally connected by its outer ends to the upper brace members 14, between the handles 19 and the pivot connections 18, in order to stiffen and secure the upper part of the chair frame. The struts 27 are shown extended in FIG. 4, for example, and partially folded in FIG. 6.

The front corners 11c of the bottom X-frame 11 are tied by a flexible strap 28 which provides a footrest.

The push-chair also includes a sheet of fabric which is supported by two seat side members 29a and by two back rest members 29b respectively connected to the seat side members 29a by means of pivot pins 30 and brackets 30a attached to the seat side members 29a. The back rest members 29b are thereby inclinable in a sense parallel to the side frames when the chair is in an extended condition. The members 29b are primarily for stiffening and controlling reclining of a fabric seat back 31 of a fabric seat 32 extending between the seat support members 15 and fastened thereto, but also contribute to stiffening the chair frame in the side to side sense, particularly by resisting forces imposed in that sense by an infant seated in the chair.

As shown in FIGS. 1 and 2, each seat side member 29a is pivotally connected to a respective seat supporting member 15 by means of six identical links 50, the rearmost four of which are attached to opposite sides of the rearmost end of the seat side member 29a. It is thereby possible to swing the seat side members 29a between rearward and forward positions, respectively shown in FIGS. 1 and 2, in which they rest on the seat supporting members 15. This allows the seat side members 29a to be moved forwardly when the back rest members 29b are lowered, as shown in FIG. 2, so that when the back rest members 29b are lowered, the centre of gravity of a child reclining on the fabric sheet supported by the seat side members 29a and the back rest members 29b remains substantially mid-way between the front and rear wheels 10.

The seat back rest members 29b (see FIG. 4) are braced in the side to side sense by a second X-frame 70 which extends between the side frames. The second X-frame comprises a pair of intersecting members 33 having a pivot pin 34 about which to pivot relatively to one another. The lower ends of the second X-frame 70 are connected by pivots 35 at fixed locations on the seat back rest members 29b themselves. The second X-frame 70 also has a connection at its upper ends which allows these ends to pivot in relation to the members 29b, but this connection is indirect, being by means of a pair of seat back links 36.

In practice the pivot pin 34 needs a slightly oversize hole in which to operate, because the pivot pin 34 moves perceptibly eccentrically in relation to the hole during folding and unfolding of the push-chair.

Each link 36 is connected to a respective seat back rest member 29b by a first pivot pin 37 at the outer end of the link at an upper fixed location on the member 29b remote from the lower fixed location of pivot pin 35 on the same member. The links 36 are interconnected by a second pivot pin 38. Each of the upper ends of the second X-frame 70 is connected to a respective link 36 by a third pivot pin 39 between the first pivot pin 37 which supports the link 36 on the respective seat back rest member 29b, and the second pivot pin 38 which interconnects the links 36. Each link 36 is thus pivotally connected indirectly through the respective pivot pin 39 to the interconnection provided by the pivot pin 34. The interconnection provided by the pivot pin 34 locates the links 36 and is fixed in relation to each pivot pin 35 and each member 29b when the push-chair is sustained in an extended condition by the locking struts 20 and 26.

The two links 36 are respectively formed with an optional extension 36a and 36b, as shown in FIG. 5, which extend beyond the second pivot 38, the extensions 36a and 36b of each link overlapping the other link when the links 36 are in an extended condition, one of the link extensions 36a engaging in a gap 40 formed between the other link and the respective upper end of one of the members 33 of the second X-frame 70.

As can be seen in FIG. 4, the second pivot pin 38 which interconnects the links 36 is disposed above a horizontal line between each of the third pivot pins 39 so that, without manipulation, folding of the second X-frame 70 will accompany folding of the rest of the push-chair.

The members 33 of the second X-frame 70 and the links 36 are preferably of stiff plastics strip so that they will fold compactly. The heads of the pivot pins 34, 35 and 37 to 39 can be seated in countersunk depressions.

The upper ends of the seat back rest members 29b are tied to the chair back elements 12 by a pair of rigid links 41 (see FIG. 9) which can be manipulated to sustain the members 29b in a forward position as in FIG. 1 and in a reclined position as shown in FIG. 2. The links 41 are arranged between and adjacent to the side frames. Each link 41 is formed at one end with a hole for receiving a first pivot pin 43 on the respective member 29b and with a slot 44 which extends along the line 41 from the other end thereof. The slot 44 receives a second pivot pin 45 carried by a bracket 12a mounted on the respective member 12. One end of each pivot pin 45 is screw threaded and fitted with an internally screw threaded knob 45a.

In order to convert the push-chair from the arrangement shown in FIG. 1 to the arrangement shown in FIG. 2, the knobs 45a are first loosened, to allow the links 41 to rotate about the pivot pins 45 and to allow the slots 44 to slide along the pivot pins 45. The seat side members 29a are then swung forward on the links 50 and, finally, the back rest members 29b are lowered and the knobs 45a are re-tightened. The reverse procedure may be adopted to return the push-chair to the arrangement shown in FIG. 1. However, in this case, it is possible to return the seat side members 29a to their rear position before raising the back rest members 29b.

Assuming that the chair is initially as in FIG. 1, in the extended condition, the auxiliary strut pair 27 is unlocked with one hand, the knob 20c kicked up to unlock the lower strut pair 20 and, by consequential upward thrusting movement of the strut or guide 24 on pivot pin 26, to cause the links 23 to fold. Such movement of the guide 24 is in relation to the slide or interconnection 22 which disengages from the links 23. Simultaneously with this disengagement of the interconnection 22, the oblique struts 21 pivot on the interconnection 22 and on the back corners 11b of the bottom X-frame 11 with consequential folding of the pair of oblique struts 21.

Figure 7:
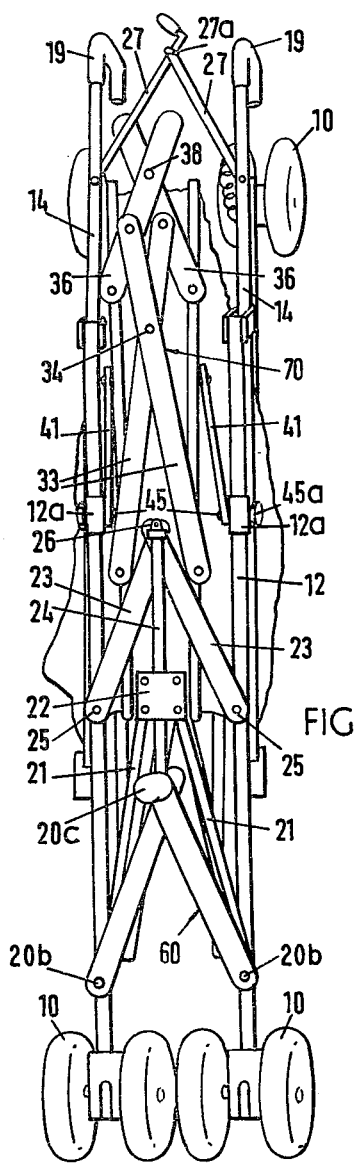
FIGS. 7 and 8 are rear and side views, respectively, of the push-chair in its fully folded condition.
Figure 8:
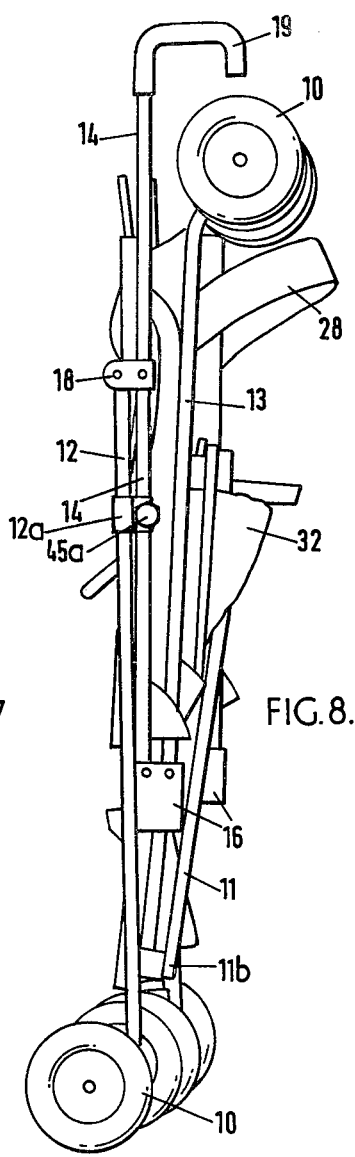
Figure 13:
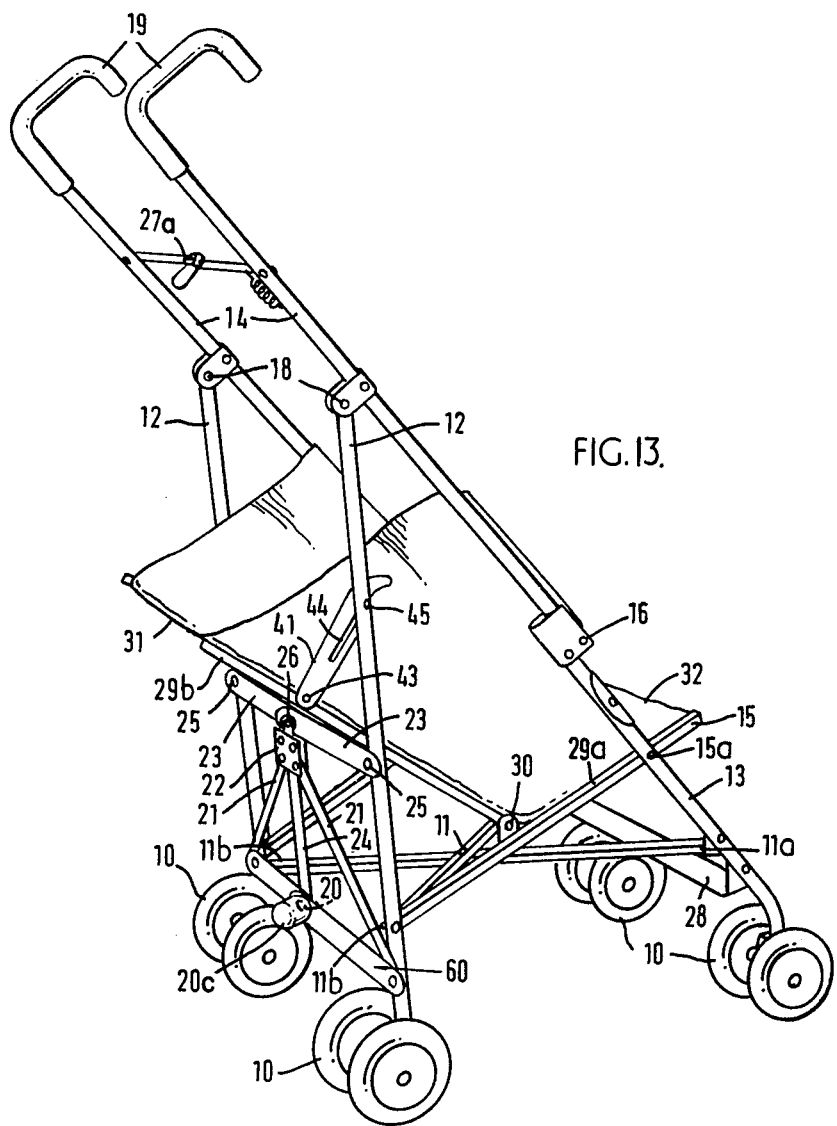

Then, by swinging the upper brace members 14 forward about the knuckle joints 16, folding of the other chair frame parts proceeds through the intermediate stage indicated by FIG. 6, side to side folding of the X-frame 11 and forward folding of the side frames occurring simultaneously because of interconnections with the seat support members 15, to a final fully folded and compact state indicated by FIGS. 7 and 8.

The chair frame is unfolded by reversal of the above procedure and finally locked by the pairs of struts 20 and 27.

It will be noted that, in FIGS. 1 to 8, the chair back members 12 carry the rear pairs of wheels 10. However, the construction shown could be modified by extending the seat support members 15 rearwards beyond the back corners 11d and mounting the rear pairs of wheels 10 suitably on the rearward extensions of the members 15, the lower ends of the chair back members 12 would terminate at the back corners 11d.

Turning now to the modified construction shown in FIG. 10, the laterally collapsible bracing frame 60 comprises two pairs of locking struts 20 and 23, having their opposite ends pivotally connected to spaced portions of the back members 12 by pivot pins 20b and 25 and are interconnected by a frame of X-form formed by a pair of intersecting members 51 having a pivot pin 52 about which to pivot relatively to one another. The lower ends of the intersecting members 51 are connected by the pivot pins 20 to respective back corners 11d of the X-frame 11. The upper ends of the intersecting members 51 are connected to respective struts 23 by pivot pins 55 located between the pivot pin 25 which supports the outer end of each strut 23 and the pivot pin 53 which interconnects the struts 23.

In practice the pivot pin 52 needs a slightly oversize hole in which to operate, because the pivot pin 52 moves perceptibly eccentrically in relation to the hole during folding and unfolding of the push-chair. The two struts 23 are respectively formed with an optional extension 23a and 23b as shown in FIG. 11, which extend beyond the second pivot 53, the extensions 36a and 36b of each strut 23 overlapping the other strut 23 when the struts are in an extended condition, one of the strut extensions 23a lying in a gap 56 formed between the other strut and the respective upper end of one of the members 51 of the X-frame 60. As before the bracing frame 60 is provided with a knob 20c to facilitate foot operation.

The push-chair shown in FIGS. 12 to 17 differs from that shown in FIGS. 1 to 9 in that the rigid links 41 are in the form shown in detail in FIG. 14. Each link 41 is formed at one end with a hole 42 for receiving a first pivot pin 43 on the respective back rest member 29b and with an L-slot 44 which extends along the line 41 from the other end thereof. The slot 44 receives a second pivot pin 45 on the respective chair back member 12. The foot 58 of the slot 44 is located adjacent to the other end of the link 41 formed with the hole 42, and is directed upwardly so that the link 41 can pivot under gravity about the first pivot pin 43 and engage the second pivot pin 45 by the foot 58 of the slot 44. The back rest members 29b are thereby maintained in the forward position.

The back rest members 29b are released for movement into the reclined position by pivoting each link 41 upwards individually by hand about the first pivot pin 43, thereby disengaging the foot 58 of the slot 44 from the pivot pin 45. As each back rest member 29b leans back from the vertical position, with each link continuing the pivoting movement started by hand, the pivot pin 43 approaches and then passes underneath the pivot pin 45 as the back rest members 29b move from the forward position shown in FIG. 12 to the reclined position shown in FIG. 13, finally coming to rest when the pivot pins 43 and 45 become separated by the full extent allowed by the L-slot 44.

The back rest members 29b are restored to forward position merely by hand pressure on the seat back, each link 41 reversing its own pivoting movement as the back rest members 29b pivoted forwardly until finally the pivot pin 45 engages the foot 58 of the slot 44.

Figure 16:
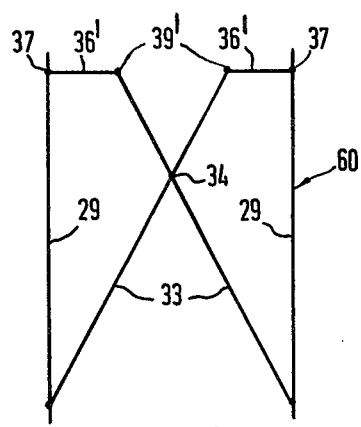
FIGS. 16 and 17 are diagrammatic representations of alternative bracing frames which may be applied to FIG. 4 or FIG. 15.
Figure 17:
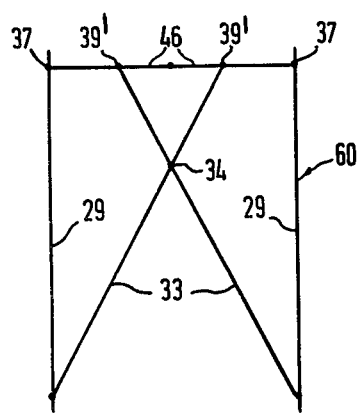

The collapsible bracing frames 60 shown in FIG. 4 and FIG. 15 may be replaced by either of the bracing frames of X-form shown diagrammatically in FIGS. 16 and 17, to which the same reference numerals are applied to the bracing frame and links to indicate the correspondence. However, the seat back links 36' in FIGS. 16 and 17 are shorter than the links seat back 36 FIG. 4 or FIG. 15, the links 36' merely connecting the pivots 37, 39'. Thus, in FIG. 16, the bracing frame 60, comprising intersecting members 33 located on pivot pin 34, has two upper ends and each of links 36' is connected to a respective upper end of the bracing frame by a pivot 39'. FIG. 17 shows one pivot 39' tied to the corresponding pivot 39' at the upper end of the bracing frame 60 by an auxiliary pair of interpivotted links 46 extending between the ends of the bracing frame.

The locking struts 20 and auxiliary struts 27 are retained in the chair back in any of the modifications above described.

Furthermore, the seat back in FIG. 4 or FIG. 5 may be modified by substituting for the seat back links 36, the equivalent of the seat back links 36' in FIG. 17.

We claim:

1. A chair frame of elongate rigid members which are inter-pivoted and foldable into a compact bundle in which the rigid members extend substantially parallel to each other, the chair frame comprising:
  (a) two base members which are pivotally interconnected to form a laterally collapsible X-frame in which the opposite ends of the two base members provide front and back corners of the X-frame;
  (b) two back members which are disposed on coplanar axes and respectively extend upwardly from pivotal connections at the back corner of the X-frame;
  (c) two lower brace members respectively pivoted, at their lower ends, to the front corners of the X-frame;
  (d) two upper brace members respectively pivoted, at their upper ends, to the upper ends of the back members;

(e) two knuckle joints respectively connecting the two lower brace members to the two upper brace members so as to prevent folding of the back members towards the X-frame when the chair frame is extended with the lower brace members respectively extending substantially colinearly with the upper brace members and the front or rear corners of the X-frame are held apart, but to allow the knuckle joints to move towards the back corners of the X-frame, thus permitting folding of the back members towards the X-frame when the back corners of the X-frame are allowed to move towards each other;

(f) two seat support members respectively pivoted to the chair frame at or adjacent the back corners of the X-frame and respectively pivoted to the lower brace members between the knuckle joints and the front corners of the X-frame;

(g) two upwardly extending back rest members which are disposed on coplanar axes and form part of a laterally collapsible back rest, respectively supported on the two seat support members and respectively mounted for pivotal movement so that the upper ends of the back rest members are movable between upper and lower positions;

(h) a laterally collapsible bracing frame which can be locked to hold the back corners of the X-frame apart and is located adjacent the X-frame so that the back rest members can be moved between their upper and lower positions without being obstructed by the collapsible bracing frame;

(i) the laterally collapsible bracing frame comprising two locking struts interconnected by a pivot and respectively pivotally connected at opposite ends to the back corners of the X-frame, two link members, each such link member being supported on a respective first pivot at one end of the link at a fixed location on a respective back member, the fixed location being remote from the respective back corner of the X-frame and each such link member being pivotally connected, remote from the first pivot of the link member, to the pivotal connection of the two locking struts by a common member which forms with a locking strut, a link member and a back member a parallelogram linkage;

(j) the common member forming a slide arranged to limit movement of the parallelogram linkage, and pivotally connected to one end of two obliquely disposed supporting members having their other ends connected to respective back corners of the X-frame.

2. A chair frame of elongate rigid members which are inter-pivoted and foldable into a compact bundle in which the rigid members extend substantially parallel to each other, the chair frame comprising:

(a) two base members which are pivotally interconnected to form a laterally collapsible X-frame in which the opposite ends of the two base members provide front and back corners of the X-frame;

(b) two back members which are disposed on coplanar axes and respectively extend upwardly from pivotal connections at the back corner of the X-frame;

(c) two lower brace members respectively pivoted, at their lower ends, to the front corners of the X-frame;

(d) two upper brace members respectively pivoted, at their upper ends, to the upper ends of the back members;

(e) two knuckle joints respectively connecting the two lower brace members to the two upper brace members so as to prevent folding of the back members towards the X-frame when the chair frame is extended with the lower brace members respectively extending substantially colinearly with the upper brace members and the front or rear corners of the X-frame are held apart, but to allow the knuckle joints to move towards the back corners of the X-frame, thus permitting folding of the back members towards the X-frame when the back corners of the X-frame are allowed to move towards each other;

(f) two seat support members respectively pivoted to the chair frame at or adjacent the back corners of the X-frame and respectively pivoted to the lower brace members between the knuckle joints and the front corners of the X-frame;

(g) two upwardly extending back rest members which are disposed on coplanar axes and form part of a laterally collapsible back rest, respectively supported on the two seat support members and respectively mounted for pivotal movement so that the upper ends of the back rest members are movable between upper and lower positions;

(h) a laterally collapsible bracing frame which can be locked to hold the back corners of the X-frame apart and is located adjacent the X-frame so that the back rest members can be moved between their upper and lower positions without being obstructed by the collapsible bracing frame; and (i) the laterally collapsible bracing frame comprising a frame of X-form having two upper ends pivotally connected to respective upper link means pivotally connected to respective back members and two lower ends pivotally connected to respective lower link means pivotally connected to the back corners of the X-frame, the upper link means being interconnected by a second pivot and each of the upper ends of the frame of X-form being connected to a respective upper link means by a respective third pivot between the first pivot which supports the outer end of each upper link means on the respective back member, and the second pivot which interconnects the upper link means.

3. A chair frame as claimed in claim 1 or claim 2, wherein two seat back links extend between the back rest members and form therewith a second laterally collapsible bracing frame.

4. A chair frame as claimed in claim 1 or claim 2, wherein two adjustable securing devices respectively connect the two back rest members to the two back members, at least when in their upper and lower positions.

5. A chair frame as claimed in claim 1 or claim 2, wherein two adjustable securing devices respectively connect the two back rest members to the back members, at least when in their upper and lower positions, and each adjustable securing device comprises a link pivotally connected at one end to a back rest member and formed with an elongate slot which extends along the link from the other end thereof and receives a pivot pin on the back member.

6. A chair frame as claimed in claim 1 or claim 2, wherein the back rest members have lower ends which are respectively pivoted to two seat side members which respectively overlie the two seat support members, and each seat side member is connected to the seat support member which it overlies by at least two equal length parallel links which, together with said seat side members and said seat support member form a parallelogram linkage so that when the upper ends of the back rest members are in their lower positions, the seat side-members may be moved from a rearward position into a forward position.

7. A chair frame as claimed in claim 1 or claim 2, wherein the upper ends of the back rest members extend through the space between the two back members when supported in their upper positions.

* * * * *